US009789654B2

(12) United States Patent
Bruce et al.

(10) Patent No.: US 9,789,654 B2
(45) Date of Patent: Oct. 17, 2017

(54) METHOD OF MANUFACTURING WETTABLE SILICONE HYDROGEL CONTACT LENSES

(71) Applicant: CooperVision International Holding Company, LP, St. Michael (BB)

(72) Inventors: Ian Bruce, Southhampton (GB); Charlie Chen, San Ramon, CA (US); Robin Frith, Southhampton (GB); Rachel Marullo, Oakland, CA (US); David Morsley, Eastleigh (GB); AKM Shahab Siddiqui, Pleasanton, CA (US); Victoria Tran, San Leandro, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 93 days.

(21) Appl. No.: 14/953,473

(22) Filed: Nov. 30, 2015

(65) Prior Publication Data
US 2016/0159019 A1    Jun. 9, 2016

Related U.S. Application Data

(60) Provisional application No. 62/087,857, filed on Dec. 5, 2014.

(51) Int. Cl.
*B29D 11/00* (2006.01)
*G02B 1/04* (2006.01)
*B29K 83/00* (2006.01)
*B29K 105/00* (2006.01)

(52) U.S. Cl.
CPC .. *B29D 11/00038* (2013.01); *B29D 11/00134* (2013.01); *B29D 11/00192* (2013.01); *B29D 11/00865* (2013.01); *G02B 1/043* (2013.01); *B29K 2039/06* (2013.01); *B29K 2083/00* (2013.01); *B29K 2105/0002* (2013.01); *B29K 2823/12* (2013.01); *B29K 2995/0092* (2013.01)

(58) Field of Classification Search
None
See application file for complete search history.

(56) References Cited

U.S. PATENT DOCUMENTS

| | | | |
|---|---|---|---|
| 3,210,230 A * | 10/1965 | Tyhurst | B29C 37/0032 156/228 |
| 3,210,448 A * | 10/1965 | Szabat | B29C 44/04 264/337 |
| 4,143,949 A | 3/1979 | Chen | |
| 5,760,100 A | 6/1998 | Nicolson et al. | |
| 5,779,943 A | 7/1998 | Enns et al. | |
| 6,310,116 B1 | 10/2001 | Yasuda et al. | |
| 6,719,929 B2 | 4/2004 | Winterton et al. | |
| 6,732,993 B2 | 5/2004 | Dean | |
| 6,811,805 B2 | 11/2004 | Gilliard et al. | |
| 6,867,245 B2 | 3/2005 | Iwata et al. | |
| 6,890,075 B2 | 5/2005 | Francis et al. | |
| 7,144,990 B2 * | 12/2006 | Goddard | C07K 14/47 530/350 |
| 7,582,327 B2 | 9/2009 | Qiu et al. | |
| 7,798,639 B2 | 9/2010 | Winterton et al. | |
| 7,811,483 B2 | 10/2010 | Witko | |
| 7,841,716 B2 | 11/2010 | McCabe et al. | |
| 7,854,866 B2 | 12/2010 | Atkinson et al. | |
| 7,875,660 B2 | 1/2011 | Winterton et al. | |
| 7,879,267 B2 | 2/2011 | Turner et al. | |
| 8,231,218 B2 | 7/2012 | Hong et al. | |
| 8,658,747 B2 | 2/2014 | Liu et al. | |
| 8,672,475 B2 | 3/2014 | Liu et al. | |
| RE46,357 E * | 4/2017 | Asai | |
| 2003/0127758 A1 * | 7/2003 | Tomono | B29C 35/0888 264/1.37 |
| 2007/0035049 A1 | 2/2007 | Bruce et al. | |
| 2008/0001317 A1 | 1/2008 | Tokarski et al. | |
| 2009/0200692 A1 | 8/2009 | Chang | |

(Continued)

FOREIGN PATENT DOCUMENTS

| | | | |
|---|---|---|---|
| EP | 2598319 B1 | 6/2013 | |
| JP | 2012037647 A | 2/2012 | |
| KR | 101197842 B1 | 11/2012 | |

OTHER PUBLICATIONS

International Preliminary Report on Patentability issued in corresponding PCT Patent Application No. PCT/GB2015/053734 dated Nov. 10, 2016 (14 pages).
International Search Report and Written Opinion issued in corresponding International Patent Application No. PCT/GB2015/053734 dated Feb. 9, 2016 (10 pages).

(Continued)

*Primary Examiner* — Tae H Yoon
(74) *Attorney, Agent, or Firm* — Kilyk & Bowersox, P.L.L.C.

(57) ABSTRACT

A method for manufacturing a silicone hydrogel contact lens is described that comprises curing a polymerizable composition comprising at least one siloxane monomer and at least one hydrophilic vinyl-containing monomer in a contact lens mold comprising a molding surface having a coating comprising a hydrophilic polymer. The hydrophilic coating is not solubilized by the polymerizable composition during the curing step. The resulting polymeric lens body is removed from the mold, washed to remove any of the hydrophilic polymer that may have transferred from the mold surface to the lens during the curing or lens removal process, and packaged to provide a silicone hydrogel contact lens having a contact angle that is lower than what it would otherwise be had the lens been cured in the same contact lens mold lacking the hydrophilic coating.

23 Claims, No Drawings

(56) References Cited

U.S. PATENT DOCUMENTS

2013/0106006 A1    5/2013  Heidrich et al.
2015/0165653 A1*   6/2015  Medina ................. B29C 39/003
                                                         264/1.7

OTHER PUBLICATIONS

Office Action received in corresponding Korean Patent Application No. 10-2017-7004601 dated Jun. 30, 2017 with English translation (6 pages).
Office Action received in corresponding Japanese Patent Application No. 2017-516353 dated Sep. 6, 2017 with partial English translation (3 pages).

* cited by examiner

METHOD OF MANUFACTURING WETTABLE SILICONE HYDROGEL CONTACT LENSES

This application claims the benefit under 35 U.S.C. §119 (e) of prior U.S. Provisional Patent Application No. 62/087,857, filed Dec. 5, 2014, which is incorporated in its entirety by reference herein.

FIELD

The field of the invention relates to the manufacture of silicone hydrogel contact lenses.

BACKGROUND

Contact lenses made from silicone hydrogels are becoming increasingly popular compared to contact lenses made from conventional hydrogel materials, because, like conventional hydrogel lenses, they are comfortable to wear. These contact lenses have the added advantage of having higher oxygen permeability, which is believed to be healthier for the eye. However, contact lenses made from silicone hydrogels often have physical properties that make them more difficult to manufacture. For example, cast-molded silicone hydrogel contact lenses can adhere to the lens molds necessitating complex processes in order to remove the cured lens from its mold without damage. Additionally, silicone hydrogel contact lenses typically need to be extracted in volatile organic solvents in order to achieve acceptable surface wettability. The use of volatile organic solvents in manufacturing presents safety and environmental concerns and adds costs to the manufacturing process.

New methods for manufacturing silicone hydrogel contact lenses that have less complex demolding and delensing requirements compared to prior methods of manufacture are sought. Methods that do not require use of volatile organic solvents to achieve ophthalmically-acceptable surface wettabilities are also desired.

Background publications include U.S. Publ. No. 2008/0001317; U.S. Publ. No. 2009/0200692; U.S. Publ. No. 2013/0106006, U.S. Pat. No. 5,779,943; U.S. Pat. No. 6,310,116; U.S. Pat. No. 6,719,929; U.S. Pat. No. 6,811,805; U.S. Pat. No. 6,890,075; U.S. Pat. No. 7,798,639; U.S. Pat. No. 7,875,660; and U.S. Pat. No. 7,879,267.

SUMMARY

Described herein is a method for manufacturing a silicone hydrogel contact lens that avoids the need for complex delensing and demolding processes. The method also results in a lens that does not need to be extracted in volatile organic solvents to achieve an ophthalmically-acceptable surface wettability. The method comprises curing a polymerizable composition comprising at least one siloxane monomer and at least one hydrophilic vinyl-containing monomer in a contact lens mold comprising a molding surface having a coating comprising a hydrophilic polymer. The hydrophilic coating is not solubilized by the polymerizable composition during the curing step. The resulting polymeric lens body is removed from the mold, washed to remove any of the hydrophilic polymer that may have transferred from the mold surface to the lens during the curing or lens removal process. The washed polymeric lens body is packaged to provide a silicone hydrogel contact lens having a contact angle that is lower than what it would otherwise be had the lens been cured in the same contact lens mold lacking the hydrophilic coating.

In one example, the contact lens mold comprises a non-polar material such as polypropylene. In another example, the coating comprises polyvinyl alcohol. In another example, the silicone hydrogel contact lens is washed in the absence of liquids comprising volatile organic solvents.

DETAILED DESCRIPTION

We disclose a method of manufacturing a wettable, ophthalmically-acceptable silicone hydrogel contact lens that may be performed without post-curing processing of the lens such as plasma treatment or surface attachment of hydrophilic polymers. The method comprises curing a polymerizable composition comprising at least one siloxane monomer and at least one hydrophilic vinyl-containing monomer in a contact lens mold comprising a lens-forming surface coated with a hydrophilic coating. After curing, the resulting polymeric lens body is washed and packaged to provide a silicone hydrogel contact lens that has a very wettable surface and is substantially free of the hydrophilic coating used to coat the contact lens mold.

The contact lens mold used in the method may be made from any suitable material for molding contact lenses. In one example, the contact lens mold comprises a non-polar material, such as polypropylene. Other examples of non-polar materials suitable for contact lens molds include cyclic olefinic polymers and copolymers, polyethylene, polystyrene, certain nylon polymers, etc. Typically, a contact lens mold comprises two combinable parts: a first (concave) mold member having a first lens forming molding surface defining the front surface of the contact lens, referred to as a front curve or the "female mold member"; and a second (convex) mold member having a second lens forming molding surface defining the back (i.e. eye-contacting) surface of the contact lens, referred to as the back curve or the "male mold member." A polymerizable composition is dispensed into the female mold member, which is then joined with the male mold member, such as by an interference fit, gluing, or welding, to form a contact lens mold assembly having a lens-shaped cavity between the lens forming molding surfaces filled with a polymerizable composition. The female and male mold members may be formed from the same or different materials. For example, one mold member may be formed from a polar material such as an ethylene vinyl alcohol resin or a polyvinyl alcohol resin (see, e.g., EP Pat. No. 2598319B1), and the other mold member may be formed from a non-polar material such as polypropylene. In a specific example, the contact lens mold comprises a polypropylene male mold member and a polypropylene female mold member. Throughout this disclosure, a reference to "an example" or "a specific example" or similar phrase, is intended to introduce a feature or features of the contact lens mold, hydrophilic coating, polymerizable composition, method of manufacture, etc. (depending on context) that can be combined with any combination of previously-described or subsequently-described examples (i.e. features), unless a particular combination of features is mutually exclusive, or if context indicates otherwise.

One or both of the lens forming surfaces of the contact lens mold is coated with a hydrophilic coating comprising at least one hydrophilic molecule. In specific examples, the hydrophilic molecule is water-soluble. The hydrophilic coating may partially cover a lens forming surface of the mold. Alternatively, the hydrophilic coating may completely cover a lens forming surface of the mold. In a specific example, the hydrophilic coating completely covers both lens forming surfaces of the contact lens mold. In one example, the hydrophilic coating is formed by applying a liquid or solid hydrophilic coating composition comprising one or more hydrophilic molecules to one or both of the lens forming surfaces of the contact lens mold using any suitable coating method. Examples of suitable coating methods include spray coating, spin coating, dip coating, roll coating, curtain coating, chemical vapor deposition, and combinations thereof. In some examples, one or both mold members may be pre-treated by air plasma, UV-ozone, or corona discharge, just prior to applying the hydrophilic coating composition. This can improve spreading of the hydrophilic coating onto the mold. However, such pre-treatments may result in a strong adhesion between the mold and the hydrophilic coating, which can make removal (i.e. delensing) of the cured polymeric lens body difficult. Accordingly, in other examples, the hydrophilic coating is applied to an untreated non-polar molding material, which enables easier removal of the cured lens from the mold as described further below.

In some examples, the contact lens mold may be prepared from a thermoplastic material which is injection molded into a mold insert tool coated with the hydrophilic coating which transfers to the contact-lens forming surface of the resulting mold. Alternatively, a double-shot molding process may be used where the thermoplastic material (e.g. polypropylene) is injection molded into the mold insert tool, followed by further injection molding of a thin layer of a hydrophilic coating composition onto at least a lens-forming surface of the mold. Methods of injection molding contact lens molds are known in the art (see, e.g., U.S. Pat. No. 6,732,993). After the hydrophilic coating composition is applied to the contact lens mold, it is typically allowed to dry prior to use. In some examples, the hydrophilic coating composition may be heated to facilitate drying onto the contact lens mold. In other examples, the hydrophilic coating composition may dry onto the contact lens mold under ambient conditions.

In one example, the hydrophilic coating composition is applied in a manner to provide a hydrophilic coating having an average thickness of about 0.01 µm, 0.05 µm, 0.1 µm, 0.25 µm, 0.5 µm, or 1.0 µm up to about 2.0 µm, 2.5 µm, 5 µm or 10 µm, or any value or range therebetween. Coating thickness may be measured using reflectance spectroscopy. Throughout this disclosure, when a series of lower limit ranges and a series of upper limit ranges are provided, all combinations of the provided ranges are contemplated as if each combination were specifically listed. For example, in the above listing of average coating thicknesses, all 24 possible ranges of average coating thicknesses are contemplated (i.e. 0.01 to 2.0 µm, 0.01 to 2.5 µm . . . 1.0 µm to 5 µm, and 1.0 µm to 10 µm). Further, throughout this disclosure, when a series of values is presented with a qualifier preceding the first value, the qualifier is intended to implicitly precede each value in the series unless context dictates otherwise. For example, for the average coating thicknesses listed above, it is intended that the qualifier "of about" implicitly precedes each of the values 0.05, 0.1, 0.25, 0.5, and 1.0, and the qualifier "to about" implicitly precedes each of 2.5, 5, and 10.

Examples of the types of hydrophilic molecules that may be included in the hydrophilic coating composition include synthetic hydrophilic polymers, as well as natural hydrophilic polymers such as gelatins (e.g. collagen-based materials), starches, hydrophilic polypeptides, and combinations thereof. Specific examples of hydrophilic polymers include polyvinyl alcohol homopolymers (PVOH), PVOH copolymers, ethylene vinyl alcohol copolymers, polyethylene oxides, polyethylene oxide copolymers, polypropylene glycol, polyvinyl pyrrolidone, carboxymethyl cellulose, hydroxypropyl methyl cellulose, polyacrylic acid, chitosan, hyaluronic acid, and combinations thereof. As used herein, the term "hydrophilic polymer" refers to a polymer containing polar and/or charged (i.e. ionic) groups that renders the polymer soluble in water. In a specific example, the hydrophilic coating molecule comprises polyvinyl alcohol. Polyvinyl alcohol of varying degrees of hydrolysis may be used. In specific examples, the polyvinyl alcohol is at least 96%, 98%, or 99% hydrolyzed. In a specific example, the hydrophilic polymer is a PVOH homopolymer and the contact lens mold comprises polypropylene. In a further specific example, the hydrophilic coating composition comprises from about 0.1%, 0.5%, 1%, or 2%, PVOH up to about 5%, 10%, or 20% PVOH, and the contact lens mold comprises polypropylene.

The hydrophilic coating composition may contain additives in addition to the one or more hydrophilic molecules. For example, one or more surfactants, binders, or other additives may be included in the hydrophilic coating composition to facilitate the formation of a thin and even coating on the lens forming surface of the mold. In a specific example, the hydrophilic coating composition consists, or consists essentially, of water and the one or more hydrophilic molecules.

In some examples, the hydrophilic coating comprises a hydrophilic polymer having an average molecular weight of from about 10,000, 25,000, or 50,000 up to about 75,000, 100,000, 125,000, 150,000, or 200,000. With respect to polydisperse molecules, the term "molecular weight" as used herein refers to the absolute number average molecular weight (in units of Daltons) of the molecule as determined by $^1$H NMR end-group analysis. In a specific example, the hydrophilic polymer is PVOH having an average molecular weight of about 25,000 to about 50,000. In another specific example, the hydrophilic polymer is PVOH having an average molecular weight of about 50,000 to about 125,000. In various examples, the hydrophilic polymer is nonionic, or is free of primary amine groups, or is both nonionic and is free of primary amine groups. In one example, the hydrophilic coating is not chemically attached to the contact lens mold, such as by covalent or ionic bonding. In other examples, the hydrophilic coating may be covalently or ionically bonded to the lens forming surface of the contact lens mold.

The polymerizable composition comprises at least one siloxane monomer and at least one hydrophilic vinyl monomer. As used herein, the term "siloxane monomer" is a molecule that contains at least one Si—O group and at least one polymerizable group. Siloxane monomers useful in contact lens compositions are well-known in the art (see, e.g., U.S. Pat. No. 8,658,747 and U.S. Pat. No. 6,867,245). As used herein, the term "mono-functional" refers to a monomer having just one polymerizable group and "bi-functional" refers to a monomer having two polymerizable groups. The polymerizable composition may comprise a mono-functional siloxane monomer, a bi-functional siloxane monomer, or both a mono-functional siloxane monomer and a bi-functional siloxane monomer. In specific examples, the siloxane monomer comprises an acryl group. As used herein, a monomer comprising an "acryl group" has the structure of structure (1):

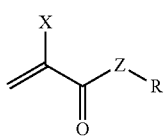

(1)

where X is hydrogen or a methyl group; Z is oxygen, sulfur, or nitrogen; and R is the remainder of the monomer. In one example, all siloxane monomers in the polymerizable composition comprise one or two acryl groups, and no other polymerizable group. In a further example, the polymerizable composition comprises a total amount of siloxane monomer of at least 10 wt. %, 20 wt. %, or 30 wt. % up to about 40 wt. %, 50 wt. %, 60 wt. % or 70 wt. %. As used herein, a given weight percentage (wt. %) is relative to the total weight of all polymerizable ingredients in the polymerizable composition; the weight of the polymerizable composition contributed by non-reactive components such as diluents is not included in the wt. % calculation.

The polymerizable composition comprises at least one hydrophilic vinyl monomer. As used-herein, a "hydrophilic vinyl monomer" is any siloxane-free (i.e. contains no Si—O groups) hydrophilic monomer having a single polymerizable carbon-carbon double bond (i.e., a vinyl group) present in its molecular structure that is not part of an acryl group (as defined by structure 1), where the carbon-carbon double bond of the vinyl group is less reactive than the carbon-carbon double bond present in a polymerizable methacrylate group (i.e. a group of structure 1 where X is a methyl group and R is oxygen) under free radical polymerization. Thus, while a carbon-carbon double bond is present in a monomer comprising a polymerizable methacrylate group, as used herein such monomers are not considered to be vinyl monomers. Further, as used herein, a monomer is "hydrophilic" if at least 50 grams of the monomer are fully soluble in 1 liter of water at 20° C. (i.e., ~5% soluble in water) as determined visibly using a standard shake flask method. In various examples, the hydrophilic vinyl monomer is N-vinyl-N-methylacetamide (VMA), or N-vinyl pyrrolidone (NVP), or 1,4-butanediol vinyl ether (BE), or ethylene glycol vinyl ether (EGVE), or diethylene glycol vinyl ether (DEGVE), or any combination thereof. In one example, the polymerizable composition comprises at least 10 wt. %, 15 wt. %, 20 wt. %, or 25 wt. % up to about 45 wt. %, 60 wt. %, or 75 wt. % of a hydrophilic vinyl monomer. As used herein, a given weight percentage of a particular class of component (e.g., hydrophilic vinyl monomer, siloxane monomer, or the like) in the polymerizable composition equals the sum of the wt. % of each ingredient in the composition that falls within the class. Thus, for example, a polymerizable composition that comprises 10 wt. % VMA and 30 wt. % NVP and no other hydrophilic vinyl monomer, is said to comprise 40 wt. % hydrophilic vinyl monomer. In a specific example, the hydrophilic polymer from the hydrophilic coating is not the same as any hydrophilic polymer in the polymerizable composition and/or formed by curing the polymerizable composition during the curing step. Thus, for example, if the polymerizable composition comprises polyvinyl pyrrolidone, the hydrophilic polymer from the hydrophilic coating on the mold will not comprise polyvinyl pyrrolidone.

The polymerizable composition may comprise a hydrophilic acryl monomer. As used herein, a "hydrophilic acryl monomer" is any hydrophilic siloxane-free monomer comprising a single acryl group of Structure 1, and no other polymerizable group. Exemplary hydrophilic acryl monomers include N,N-dimethylacrylamide (DMA), 2-hydroxyethyl methacrylate (HEMA), ethoxyethyl methacrylamide (EOEMA), ethylene glycol methyl ether methacrylate (EGMA), and combinations thereof. As the amount of hydrophilic acryl monomer relative to amount of hydrophilic vinyl monomer increases in a polymerizable composition, the wettability of the resulting silicone hydrogel contact lens can decrease. In some cases, this may be due to the hydrophilic coating becoming solubilized by the polymerizable composition. In other cases, the hydrophilic acryl monomer in the polymerizable composition may prevent the hydrophilic vinyl monomers from being drawn towards the lens-forming surface of the mold, thereby causing them to polymerize within the bulk of the lens-forming polymer, resulting in a less wettable lens surface. Accordingly, in some examples, the polymerizable composition comprises less than 20 wt. % of a hydrophilic acryl monomer, based on total weight of polymerizable components in said polymerizable composition. In one example, the polymerizable composition comprises from about 1 wt. % or 5 wt. % up to about 10 wt. %, 15 wt. % or 20 wt. % of a hydrophilic acryl monomer. In another example, the polymerizable composition comprises a hydrophilic vinyl monomer and a hydrophilic acryl monomer at a weight ratio of at least 2 to 1, respectively. In a further example, the polymerizable composition is substantially free of, i.e., is in the absence of, a hydrophilic acryl monomer. We have also found that inclusion a hydrophilic acryl monomer comprising one or more carboxylic acid groups, such as methacrylic acid, can reduce the wettability of a contact lens manufactured by the present method. Accordingly, in a specific example, the polymerizable composition comprises less than about 2 wt. %, 1.5 wt. %, or 1 wt. % of a carboxylic acid-containing hydrophilic acryl monomer. In a further example, the polymerizable composition is substantially free of a carboxylic acid-containing hydrophilic acryl monomer.

The polymerizable composition may additionally comprise at least one cross-linking agent. As used herein, a "cross-linking agent" is a molecule having at least two polymerizable groups. Thus, a cross-linking agent can react with functional groups on two or more polymer chains so as to bridge one polymer to another. The cross-linking agent may comprise an acryl group or a vinyl group, or both an acryl group and a vinyl group. In certain examples the cross-linking agent is free of siloxane moieties, i.e., it is a non-siloxane cross-linking agent. A variety of cross-linking agents suitable for use in silicone hydrogel polymerizable compositions are known in the field (see, e.g., U.S. Pat. No. 8,231,218, incorporated herein by reference). Examples of cross-linking agents that can be used in the polymerizable compositions disclosed herein, include, without limitation, lower alkylene glycol di(meth)acrylates such as triethylene glycol dimethacrylate and diethylene glycol dimethacrylate; poly(lower alkylene)glycol di(meth)acrylates; lower alkylene di(meth)acrylates; divinyl ethers such as triethyleneglycol divinyl ether, diethyleneglycol divinyl ether, 1,4-butanediol divinyl ether and 1,4-cyclohexanedimethanol divinyl ether; divinyl sulfone; di- and trivinylbenzene; trimethylolpropane tri(meth)acrylate; pentaerythritol tetra(meth)acrylate; bisphenol A di(meth)acrylate; methylenebis(meth)acrylamide; triallyl phthalate; 1,3-Bis(3-methacryloxypropyl)tetramethyldisiloxane; diallyl phthalate; and combinations thereof.

As will be appreciated by those skilled in the art, the polymerizable composition may comprise additional polymerizable or non-polymerizable ingredients conventionally used in contact lens formulations such as one or more of a polymerization initiator, a UV absorbing agent, a tinting agent, an oxygen scavenger, a chain transfer agent, or the like. In some examples, the polymerizable composition may include an organic diluent in an amount to prevent or minimize phase separation between the hydrophilic and hydrophobic components of the polymerizable composition, so that an optically clear lens is obtained. Diluents commonly used in contact lens formulations include hexanol, ethanol, and/or other alcohols. In other examples, the polymerizable composition is substantially free of an organic diluent. In such examples, the use of siloxane monomers containing hydrophilic moieties such as polyethylene oxide groups, pendant hydroxyl groups, or other hydrophilic groups, may make it unnecessary to include a diluent in the polymerizable composition. Non-limiting examples of these and additional ingredients that may be included in the polymerizable composition are provided in U.S. Pat. No. 8,231,218.

The polymerizable composition is dispensed into the coated mold and cured (i.e. polymerized) using any suitable curing method. Typically, the polymerizable composition is exposed to polymerizing amounts of heat or ultraviolet light (UV). In the case of UV-curing, also referred to as photopolymerization, the polymerizable composition typically comprises a photoinitiator such as benzoin methyl ether, 1-hydroxycyclohexylphenyl ketone, DAROCUR, or IRGACUR (available from Ciba Specialty Chemicals). Photopolymerization methods for contact lenses are described in, e.g., U.S. Pat. No. 5,760,100. The UV cure of a polymerizable composition in polypropylene, or other non-polar molding material, coated with a hydrophilic coating typically has higher UV transmissibility over a polar molding material such as EVOH. Therefore, the molds disclosed herein can be advantageous for UV-cured formulations because energy consumption and/or cure times can be reduced. In the case of heat-curing, also referred to as thermal curing, the polymerizable composition typically comprises a thermal initiator. Exemplary thermal initiators include 2,2'-azobis(2,4-dimethylpentanenitrile) (VAZO-52), 2,2'-Azobis(2-methylpropanenitrile) (VAZO-64), and 1,1'-azo bis(cyanocyclohexane) (VAZO-88). Thermal polymerization methods for contact lenses are described in, e.g., U.S. Pat. No. 8,231,218 and U.S. Pat. No. 7,854,866, which are incorporated herein by reference.

The contact lens mold material, the hydrophilic coating, and the polymerizable composition are selected so that the hydrophilic coating is not solubilized by the polymerizable composition during the curing step. Without being bound by any theory, when the hydrophilic coating remains interfaced between the lens-forming surface of the mold and the polymerizable composition, it draws hydrophilic vinyl monomers towards the surface of the lens during the curing step thereby resulting in a wettable lens. In contrast, if the hydrophilic coating is solubilized by the polymerizable composition, the coating may absorb into the polymerizable composition, and the hydrophilic vinyl monomers may not be drawn towards the lens-forming surface of the mold. Consequently, the wettability of the contact lens may decrease. Further, when the hydrophilic coating is partially solubilized by the polymerizable composition during the curing step, typically the resulting lenses have rough surfaces as determined by visual inspection using a zonometer. In more extreme cases, a solubilized coating may result in improper curing, resulting in weakened lenses that split during hydration. Generally, the more polar the hydrophilic coating, the less likely it is to be solubilized by the polymerizable composition. Hydrophilic polymers that are exclusively soluble in water and insoluble in volatile organic solvents such as ethanol, isopropanol, and acetone, are unlikely to be soluble in the polymerizable composition.

At the completion of curing, the male and female mold members are separated (i.e. demolded) and the polymeric lens body is removed from the mold member (i.e. delensed). When a non-polar molding material such as polypropylene is used, the hydrophilic coating typically becomes strongly adhered to the polymeric lens body and is only very weakly adhered to the non-polar molding material. Consequently, the polymeric lens body can be easily and gently removed from the mold using a dry-delensing method. Advantageously, this can provide a higher throughput manufacturing process with fewer defective lenses and high manufacturing yields. An exemplary automated dry-delensing process is described in U.S. Pat. No. 7,811,483. In other examples, a wet-delensing process, sometimes referred to as "float off" may be used to remove the polymeric lens body from the mold. Examples of wet-delensing methods are described in U.S. Patent Publication No. 2007/0035049.

After curing, the polymeric lens body is washed to 1) remove any hydrophilic coating adhered on the surface of the polymeric lens body, 2) extract any unreacted or partially reacted ingredients from the polymeric lens body, and 3) hydrate the polymeric lens body to provide an ophthalmically-acceptable silicone hydrogel contact lens. The washing step involves contacting the polymeric lens body with one or more volumes of one or more washing liquids. In the case of a wet delensing process, at least part of the washing process is simultaneous with the delensing process. However, a non-polar mold, such as polypropylene, coated with a hydrophilic polymer, such as PVOH, can form a polymeric lens body that is dry-delensable. Upon release from the mold, the polymeric lens body is contained within a "sachet" of the hydrophilic coating. The sachet can be easily dissolved off the polymeric lens body with warm water or other suitable washing liquid, usually in less than one or two seconds. In turn, the polymeric lens body hydrates very quickly and evenly as there is no barrier between it and the washing liquid. Accordingly, in a specific example, the polymeric lens body is dry-delensed from the mold.

The washing liquid used to wash and hydrate the polymeric lens body may comprise one or more volatile organic solvents (e.g., methanol, ethanol, chloroform, or the like). However, advantageously, the present method can provide a highly wettable contact lens by washing the polymeric lens body in a washing liquid free of volatile organic solvents, where the polymeric lens body is not contacted with any volatile organic solvents during the manufacturing process (i.e., from the initiation of the washing step until the time the lens is sealed in its final packaging). Thus, in one example, the washing step is conducted in the absence of liquids comprising volatile organic solvents.

After washing, and any optional process step (e.g. surface modification to attach a beneficial agent), the hydrated polymeric lens body is placed into a blister package, glass vial, or other appropriate container, all referred to herein as "packages." Typically, packaging solution is also added to the container. Suitable packaging solutions include phosphate- or borate-buffered saline together with any optional additional ingredients such as a comfort agent, a medication, a surfactant to prevent the lens from sticking to its package, or the like. The package is sealed, and the sealed polymeric lens body is sterilized by radiation, heat or steam (e.g., autoclaving), gamma radiation, e-beam radiation, or the like. In some examples, the lens may be packaged under sterile conditions, making a post-packaging sterilization step unnecessary. In some examples, the polymeric lens body may be dry delensed, placed directly into its final package together with packaging solution, sealed, and optionally sterilized. Thus, the washing step may be concurrent with the packaging and sterilization steps. In a specific example, the polymeric lens body is sterilized by autoclaving.

The silicone hydrogel contact lens manufactured by the present method has a contact angle, referred to as a "first contact angle," that is lower than the contact angle, referred to herein as a "second contact angle" of a control lens, wherein a "control lens," as used herein, refers to a lens made from the same polymerizable composition and manufactured using the same method except that it is cured in an uncoated, but otherwise identical, contact lens mold. As used herein, the term "contact angle" refers to a dynamic advancing contact angle of the contact lens as measured by captive bubble method upon removal of the lens from its package subsequent to any post-packaging sterilization step. The lens to be tested is soaked in phosphate buffered saline at room temperature for at least 30 minutes, or overnight if the contact lens packaging solution contains a surfactant or other additive to enhance lens lubricity. The dynamic advancing contact angle of the lens is tested using a drop shape analysis system (e.g. KRUSS DSA 100). In a specific example, the contact angle of the lens manufactured by the present method is less than 60 degrees, less than 55 degrees, less than 50 degrees, or less than 45 degrees. In another example, the contact angle of the lens manufactured by the present method is at least 10%, 20%, or 30% lower than the contact angle of a control lens. In a further example, the contact angle of the silicone hydrogel contact lens (the first contact angle) is less than 50 degrees and the contact angle of a corresponding control lens (the second contact angle) is greater than the first contact angle by at least 5 degrees, 10 degrees, 20 degrees, or 30 degrees.

The surface of the silicone hydrogel contact lens manufactured by the present method is free of, or substantially free of, the hydrophilic molecule from the hydrophilic coating. Thus, the present method differs from previous methods where mold transfer of hydrophilic polymers results in the formation of an interpenetrating polymer network at the lens surface to increase surface wettability (see, e.g., U.S. Pat. No. 7,879,267). A lens surface is substantially free of the hydrophilic molecule from the hydrophilic coating when the hydrophilic molecule from the coating composition is not detectable on the lens surface (e.g., up to a depth of 10 Å of the lens material) as determined by standard analytical methods, for example, such as by time-of-flight secondary ion mass spectrometry (TOF-SIMS). In some cases, it can be determined that the hydrophilic coating transferred to the lens surface during the curing step when the lens exhibits a reduced contact angle compared to a control lens, but the difference in contact angle decreases as the transferred hydrophilic coating is washed away with more rigorous washing, such as by subjecting the lenses to a second autoclave step.

The good wettability of the contact lenses achieved by the method described herein makes post-polymerization surface modification of the lens unnecessary. One example of a post-polymerization surface modification used to impart wettability is surface plasma treatment (see, e.g., U.S. Pat. No. 4,143,949). Another example of a post-polymerization modification to impart wettability is the coating of hydrophilic polymers onto the surface of the polymeric lens body such as by a layer-by-layer technique (see, e.g., U.S. Pat. No. 7,582,327), or by the addition of a hydrophilic polymer into the packaging solution (see, e.g., U.S. Pat. No. 7,841,716). Accordingly, in a specific example, the silicone hydrogel contact lens is manufactured in the absence of a post-polymerization surface modification to impart wettability to the contact lens. As used herein, lens hydration (i.e., a washing step) is considered distinct from a post-polymerization surface modification.

Contact lenses produced by the present method are substantially free of defects in the optic zone of the lens as determined by zonometer imaging. Additionally, the lenses are optically clear, meaning that light transmittance between 381 nm to 780 nm is at least 95% (measured in accordance with ISO 18369).

The following Examples illustrate certain aspects and advantages of the present invention, which should be understood not to be limited thereby.

Example 1: Preparation of PVOH-Coated Polypropylene Molds

Male and female mold pairs were wetted by a solution 10% PVOH (MW 89-98K) solution in water. This was done by filling each mold pair with 65 µL of the PVOH solution, gently closing and then separating the mold pair. Each male and female mold half was spun for approximately 20 seconds at 8,800 RPM via a Maxon motor running EPOS studio software. Molds were dried at room temperature for 1 hour to 1 day prior to use. Each mold half had a PVOH film thickness in the range of 250 nm to 5 um as determined by spectral reflectance (F20, Filmetrics).

Example 2: Preparation of HEMA-Containing Silicone Hydrogel Contact Lenses in PVOH-Coated Polypropylene Molds Contact lens formulations A-C were prepared by mixing together the components shown in Table 1. Each composition was dispensed into either coated (n=8) or uncoated molds (n=8) and thermally cured in an air oven (i.e., without $N_2$) at 100° C. for 60 minutes. After curing, the molds were opened and the lenses removed from the mold half using tweezers. Each lens was washed by three exchanges of 3 mL deionized water (DI $H_2O$) for 10 minutes each exchange without agitation. Each lens was then placed into a vial containing 4 mL PBS, capped, and autoclaved. The autoclaved lenses were removed from the vials. All lenses were free of visible deformations such as wrinkles and wavy edges. Lenses of formulations A and B were optically clear. Lenses of formulation C were slightly cloudy. The dynamic, advancing contact angle of each lens was measured by captive bubble method using a KRUSS Drop Shape Analyzer 100. The results are shown in Table 2.

TABLE 1

Formulations C1-C3

| Component | Parts A | Parts B | Parts C |
|---|---|---|---|
| 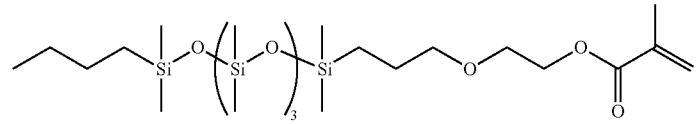 | 30.0 | 30.0 | 30.0 |
| N-vinylpyrrolidone | 43.0 | 55.0 | 65.0 |
| Hydroxyethyl methacrylate | 27.0 | 15.0 | 5.0 |
| ethylene glycol dimethacrylate | 0.30 | 0.30 | 0.30 |
| Allyl methacrylate | 0.10 | 0.20 | 0.30 |
| 2,2'-dimethyl-2,2'azodipropiononitrile | 0.50 | 0.50 | 0.50 |
| diphenyl(4-vinylphenyl)phosphine | 0.50 | 0.50 | 0.50 |
| 2-(2'-Hydroxy-5'-methacryloxyethylphenyl)-2H-benzotriazole | 1.7 | 1.7 | 1.7 |

TABLE 2

Advancing Contact Angle of Contact Lenses

| Formulation | Uncoated | PVOH-coated |
|---|---|---|
| A | 84.4° | 62.9° |
| B | 79.3° | 52.3° |
| C | 85.3° | 46.2° |

The results demonstrate that the reduction in contact angle achieved with PVOH-coated molds compared to uncoated molds increased as the ratio of NVP to HEMA increased.

Example 3: Preparation of DMA-Containing Silicone Hydrogel Contact Lenses in PVOH-Coated Polypropylene Molds A silicone hydrogel contact lens formulation was prepared by mixing together about 38 parts of a monomethacryloxypropyl functional polydimethylsiloxane having an average molecular weight of about 900, about 20 parts methyl bis(trimethylsiloxy)silyl propyl glycerol methacrylate, about 40 parts N,N-dimethylacrylamide (DMA), about 1 part triethylene glycol dimethacrylate, less than 1 part thermal initiator (VAZO-64), and less than 1 part triphenylphosphine. The composition was dispensed into either coated or uncoated molds prepared as described in Example 1 and thermally cured in an air oven (i.e., without $N_2$) at 55° C., 80° C., and 100° C. for 40 minutes each. After curing, the molds were opened and the lenses removed from the mold half using tweezers. Each lens was placed in 4 ml DI water for 2 hours. Each lens was then placed into vials containing 4 ml PBS. Lenses were either not autoclaved (n=3), autoclaved 1× (n=3), or autoclaved 2× (n=3), with the lenses brought to room temperature between autoclaves. The dynamic advancing contact angle of each lens was measured. The results are shown in Table 3.

TABLE 3

Advancing Contact Angle of Contact Lenses

| No. Autoclaves | Uncoated | PVOH-coated |
|---|---|---|
| 0 | 91.2° | 53.8° |
| 1 | 82.9° | 77.1° |
| 2 | 83.8° | 85.1° |

The results suggest that the reduced contact angle of lenses cured in PVOH-coated molds prior to autoclave is due to residual PVOH on the surface of the lens, which is partially removed by a single autoclave, and fully removed after a second autoclave. The results further indicate that a polymerizable composition containing no hydrophilic vinyl-containing monomer does not provide a wettable lens when cured in a PVOH-coated polypropylene mold despite containing a high concentration of a hydrophilic acryl monomer (i.e., DMA).

Example 4: Comparison of Ethanol and Water Washing of Silicone Hydrogel Contact Lenses Cured in PVOH-Coated Molds Two polymerizable compositions were prepared. Formulation D comprised about 42 wt. % of VMA, 9 wt. % of a bi-functional siloxane monomer having an average molecular weight of about 9,000 Daltons, 27 wt. % of a low molecular weight siloxane monomer, 19 wt. % of acrylate-containing hydrophilic monomer, 1 wt. % of a non-siloxane cross-linking agent, and less than 1 wt. % of a thermal initiator. Formulation E comprised about 27 wt. % NVP, 9 wt. % VMA, 40 wt. % of a bi-functional siloxane monomer having an average molecular weight of about 15,000 Daltons, 9 wt. % of a low molecular weight siloxane monomer, 14 wt. % of acrylate-containing hydrophilic monomer, less than 1 wt. % of a non-siloxane cross-linking agent, and less than 1 wt. % of a thermal initiator. The polymerizable compositions were individually dispensed into either coated (n=8) or uncoated molds (n=8) and thermally cured in an $N_2$-purged oven at 40 min at 55° C., 40 min at 80° C., and 40 min at 100° C. After curing, the molds were opened and the lenses removed using tweezers. Each lens was washed in either DI $H_2O$ using the same wash method as described in Example 2, or in ethanol (EtOH) by placing a lens in 3 mL EtOH for 30 minutes—two exchanges, followed by placement in 3 ml of 50% EtOH (in DI $H_2O$) for 30 minutes, with three final exchanges in DI $H_2O$ for 10 minutes each exchange. The washed lenses were placed into vials containing 4 ml PBS, capped, and autoclaved. The autoclaved lenses were removed from their packaging. All lenses were optically clear and free of visible deformations such as wrinkles and wavy edges. The dynamic, advancing contact angle of each lens was measured by captive bubble method using a KRUSS Drop Shape Analyzer 100. The results are shown in Table 4.

TABLE 4

Advancing Contact Angle of Contact Lenses

| Formulation/wash | Uncoated | PVOH-coated |
|---|---|---|
| Formulation D/water | 55.5° | 40.8° |
| Formulation D/EtOH | 43.4° | 39.8° |
| Formulation E/water | 79.7° | 40.0° |
| Formulation E/EtOH | 73.4° | 39.9° |

The results demonstrate that a polymerizable silicone hydrogel formulation cured in a PVOH-coated polypropylene mold can provide a wettable contact lens having a contact angle of about 40° with water washes and no contact with volatile organic solvents. In contrast, the same formulation (formulation D) cured in an uncoated mold results in a contact lens that required washing in a volatile organic solvent (i.e., ethanol) in order to achieve a contact angle of less than 50°. This example also demonstrates that some silicone hydrogel formulations will not result in a wettable lens regardless of washing method if it is cured in a non-polar mold such as polypropylene. However, the same formulation (formulation E) results in a wettable lens when cured in a PVOH-coated mold after either ethanol or water washing.

A contact lens made with formulation E cured in a PVOH-coated mold and washed in ethanol using the above-describe washing method was tested by time-of-flight secondary ion mass spectrometry (TOF-SIMS) for the presence of PVOH on the lens surface. Positive and negative ion data were acquired. Pertinent peaks were integrated, tabulated and normalized. There was no evidence of PVOH on the lens. In contrast an unwashed lens made with formulation E cured in a PVOH-coated mold was analyzed by TOF-SIMS and exhibited peaks consistent with PVOH.

This Example demonstrates that using the manufacturing method disclosed herein can obviate the need to wash with volatile organic solvents in order to obtain a highly wettable lens. In particular, formulation D provided a wettable contact lens having a contact angle of about 40° with water washes and no contact with volatile organic solvents. In contrast, the same formulation cured in an uncoated mold resulted in a contact lens that was not wettable after water washing, and required washing in a volatile organic solvent (i.e. ethanol) in order to achieve a wettable lens (i.e. a lens having a contact angle of less than 50°).

This Example also demonstrates that certain silicone hydrogel formulations will not result in a wettable lens regardless of washing method if it is cured in a non-polar mold such as polypropylene, whereas the formulation can result in a wettable lens when cured in a PVOH-coated mold after ethanol and/or water washing.

The disclosure herein refers to certain illustrated examples, it is to be understood that these examples are presented by way of example and not by way of limitation. The intent of the foregoing detailed description, although discussing exemplary examples, is to be construed to cover all modifications, alternatives, and equivalents of the examples as may fall within the spirit and scope of the invention as defined by the additional disclosure.

The entire contents of all cited references in this disclosure, to the extent that they are not inconsistent with the present disclosure, are incorporated herein by reference.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

The present invention includes the following aspects/embodiments/features in any order and/or in any combination:

1. A method of manufacturing a silicone hydrogel contact lens, said method comprising a) curing a polymerizable composition comprising at least one siloxane monomer and at least one hydrophilic vinyl-containing monomer in a contact lens mold to form a polymeric lens body; and b) washing and packaging the polymeric lens body to provide a silicone hydrogel contact lens having a first contact angle; wherein the contact lens mold comprises a molding surface coated with a hydrophilic coating comprising at least one hydrophilic molecule, wherein the hydrophilic coating is not solubilized by the polymerizable composition during the curing step, wherein the silicone hydrogel contact lens is substantially free of the hydrophilic molecule from the hydrophilic coating, and wherein the first contact angle is lower than a second contact angle of a control silicone hydrogel contact lens cured in an uncoated, but otherwise identical, contact lens mold and manufactured using a method that is identical to the method of manufacturing the silicone hydrogel contact lens.

2. The method of 1, wherein the contact lens mold comprises a non-polar material.

3. The method of 2, wherein the contact lens mold comprises polypropylene.

4. The method of any one of 1 to 3, wherein prior to the curing step, a hydrophilic coating composition is applied to the contact lens mold by a process that comprises spin-coating or spray-coating.

5. The method any one of 1 to 4, wherein the hydrophilic coating has an average thickness of about 0.01 µm to about 10 µm.

6. The method of any one of 1 to 5, wherein the hydrophilic molecule is a hydrophilic polymer.

7. The method of any one of 1 to 6, wherein the hydrophilic polymer comprises gelatin, a starch, a hydrophilic polypeptide, a polyvinyl alcohol (PVOH) homopolymer, a PVOH copolymer, an ethylene vinyl alcohol copolymer, a polyethylene oxide, a polyethylene oxide copolymer, a polypropylene glycol, a polyvinyl pyrrolidone, a carboxymethyl cellulose, a hydroxypropyl methyl cellulose, a polyacrylic acid, chitosan, a hyaluronic acid, or any combination thereof.

8. The method of 6 or 7, wherein the hydrophilic polymer is nonionic.

9. The method of any one of 6 to 8, wherein the hydrophilic polymer has an average molecular weight of about 10,000 to about 125,000.

10. The method of any one of 1 to 7, wherein the hydrophilic coating comprises polyvinyl alcohol (PVOH).

11. The method of 10, wherein the PVOH has an average molecular weight of about 25,000 to about 50,000.

12. The method of any one of 1 to 11, wherein the hydrophilic molecule is PVOH that is at least 96% hydrolysed.

13. The method of any one of 1 to 12, wherein the polymerizable composition comprises a total amount of siloxane monomer of about 20 wt. % to about 60 wt. %.

14. The method of any one of 1 to 13, wherein the polymerizable composition comprises a total amount of hydrophilic vinyl-containing monomer of about 20 wt. % to about 60 wt. %.

15. The method of any one of 1 to 14, wherein the hydrophilic vinyl-containing monomer is N-vinyl-N-methylacetamide (VMA), or N-vinyl pyrrolidone (NVP), or a combination of both VMA and NVP.

16. The method of any one of 1 to 15, wherein the polymerizable composition comprises an acrylate-containing hydrophilic monomer in an amount up to about 20 wt. %.

17. The method of any one of 1 to 16, wherein the polymerizable composition comprise at least one acrylate-containing hydrophilic monomer, and the polymerizable composition has a weight ratio of total amount of hydrophilic vinyl-containing monomer to total amount of acrylate-containing hydrophilic monomer of at least 2:1.

18. The method of any one of 1 to 17, wherein the silicone hydrogel contact lens is washed in the absence of liquids comprising volatile organic solvents.

19. The method of any one of 1 to 18, wherein prior to the washing step, the polymeric lens body is dry-delensed from the mold.

20. The method of any one of 1 to 19, wherein the first contact angle is less than 50°.

21. The method of any one of 1 to 20, wherein the first contact angle is at least 30% lower than the second contact angle.

22. The method of any one of 1 to 21, wherein the curing step comprises exposing the polymerizable composition to polymerizing amounts of ultraviolet (UV) light.

23. The method of any one of 1 to 22, wherein the silicone hydrogel contact lens is manufactured in the absence of a post-polymerization surface modification to impart wettability to the contact lens.

24. The method of any one of 6 to 23, wherein the hydrophilic polymer from the hydrophilic coating is not the same as any hydrophilic polymer in the polymerizable composition and/or formed by curing the polymerizable composition during the curing step.

25. A silicone hydrogel contact lens manufactured by any one of the preceding methods.

What is claimed is:

1. A method of manufacturing a silicone hydrogel contact lens, said method comprising:
   a. curing a polymerizable composition comprising at least one siloxane monomer and at least one hydrophilic vinyl-containing monomer in a contact lens mold to form a polymeric lens body; and
   b. washing and packaging the polymeric lens body to provide a silicone hydrogel contact lens having a first contact angle;
   wherein said contact lens mold comprises a molding surface coated with a hydrophilic coating comprising at least one hydrophilic polymer,
   wherein the hydrophilic coating is not solubilized by the polymerizable composition during the curing step, and
   the silicone hydrogel contact lens is substantially free of the hydrophilic polymer from the hydrophilic coating, and
   the first contact angle is lower than a second contact angle of a control silicone hydrogel contact lens cured in an uncoated, but otherwise identical, contact lens mold and manufactured using a method that is identical to the method of manufacturing the silicone hydrogel contact lens, and wherein the hydrophilic polymer is free of primary amine groups and has an average molecular weight of about 10,000 daltons to about 200,000 daltons.

2. The method of claim 1, wherein the contact lens mold comprises a non-polar material.

3. The method of claim 2, wherein the contact lens mold comprises polypropylene.

4. The method of claim 1, wherein prior to the curing step, the hydrophilic coating is applied to the contact lens mold by a process that comprises spin-coating or spray-coating.

5. The method of claim 1, wherein the coating has an average thickness of about 0.01 μm to about 10 μm.

6. The method of claim 1, wherein the hydrophilic polymer has said average molecular weight of about 10,000 daltons to about 125,000 daltons.

7. The method of claim 1, wherein the coating comprises polyvinyl alcohol (PVOH).

8. The method of claim 1, wherein the molding surface is pre-treated by air plasma, UV-ozone, or corona discharge prior to being coated with the hydrophilic coating.

9. The method of claim 1, wherein the polymerizable composition comprises a total amount of siloxane monomer of about 20 wt. % to about 60 wt. % based on the total weight of all polymerizable ingredients in the polymerizable composition.

10. The method of claim 1, wherein the polymerizable composition comprises a total amount of hydrophilic vinyl-containing monomer of about 20 wt. % to about 60 wt. % based on the total weight of all polymerizable ingredients in the polymerizable composition.

11. The method of claim 1, wherein the hydrophilic vinyl-containing monomer is N-vinyl-N-methylacetamide (VMA), or N-vinyl pyrrolidone (NVP), or a combination of both VMA and NVP.

12. The method of claim 1, wherein the polymerizable composition further comprises an acrylate-containing hydrophilic monomer in an amount up to 20 wt. % based on the total weight of all polymerizable ingredients in the polymerizable composition.

13. The method of claim 1, wherein the polymerizable composition further comprise at least one acrylate-containing hydrophilic monomer, and the polymerizable composition has a ratio of total amount of hydrophilic vinyl-containing monomer to total amount of acrylate-containing hydrophilic monomer of at least 2:1.

14. The method of claim 1, wherein the polymerizable composition comprises no more than 1 wt. % of an acrylate-containing monomer comprising a carboxylic acid group based on the total weight of all polymerizable ingredients in the polymerizable composition.

15. The method of claim 1, wherein the polymerizable composition is in the absence of an acrylate-containing hydrophilic monomer.

16. The method of claim 1, wherein the polymerizable composition is diluent-free.

17. The method of claim 1, wherein the silicone hydrogel contact lens is washed in the absence of liquids comprising volatile organic solvents.

18. The method of claim 1, wherein the first contact angle is less than 50°.

19. The method of claim 1, wherein the first contact angle is at least 30% lower than the second contact angle.

20. The method of claim 1, wherein the curing step comprises exposing the polymerizable composition to polymerizing amounts of ultraviolet (UV) light.

21. The method of claim 1, wherein prior to the washing step, the polymeric lens body is dry-delensed from the mold.

22. The method of claim 1, wherein the silicone hydrogel contact lens is manufactured in the absence of a post-polymerization surface modification to impart wettability to the contact lens.

23. The method of claim 1, wherein the hydrophilic polymer from the hydrophilic coating is not the same as any hydrophilic polymer in the polymerizable composition and/or formed by curing the polymerizable composition during the curing step.

* * * * *